(12) United States Patent
Hellwig (10) Patent No.: US 9,440,411 B2
(45) Date of Patent: Sep. 13, 2016

(54) LIVING ROOF AND WALL SYSTEMS USING CULTIVATED MINERAL WOOL MATS TO SUPPORT BLAVES, METHODS OF CULTIVATION AND INNOCULANTS THEREFOR

(75) Inventor: Roy T. Hellwig, Sequim, WA (US)

(73) Assignee: ARCHIPHYTE, LLC, Sequim, WA (US)

( * ) Notice: Subject to any disclaimer, the term of this patent is extended or adjusted under 35 U.S.C. 154(b) by 819 days.

(21) Appl. No.: 13/024,945

(22) Filed: Feb. 10, 2011

(65) Prior Publication Data

US 2011/0197504 A1 Aug. 18, 2011

Related U.S. Application Data

(60) Provisional application No. 61/305,413, filed on Feb. 17, 2010.

(51) Int. Cl.
*A01G 1/00* (2006.01)
*B32B 5/02* (2006.01)
*A01G 9/02* (2006.01)

(52) U.S. Cl.
CPC .............. *B32B 5/022* (2013.01); *A01G 1/005* (2013.01); *A01G 9/025* (2013.01); *B32B 2262/108* (2013.01); *B32B 2419/06* (2013.01); *B32B 2607/00* (2013.01); *Y02B 80/32* (2013.01);
(Continued)

(58) Field of Classification Search
USPC ... 47/1.01 R, 59 S, 62 N, 31, 33, 65.5, 65.7, 47/65.9, 46, 56, 58.1 SE, 9, 66.1, 66.5
See application file for complete search history.

(56) References Cited

U.S. PATENT DOCUMENTS 3,988,858 A * 11/1976 Bomba ...................... 47/58.1 R
4,550,527 A * 11/1985 Hall et al. .................. 47/58.1 R
5,390,442 A    2/1995 Behrens
(Continued)

FOREIGN PATENT DOCUMENTS

DE    19629669 A    7/1997
DE    19629669 A    1/2008
(Continued)

OTHER PUBLICATIONS

Building Logics. "Green Roof systems" <http://www.buildinglogics.com/pdfs/SPECS_IN_DEPTH.pdf, Accessed on Mar. 23, 2011, Available Oct. 14, 2003> p. 1-10, entire document.

*Primary Examiner* — Lisa Tsang
(74) *Attorney, Agent, or Firm* — Innovation Law Group, Ltd; Jacques M. Dulin, Esq.

(57) ABSTRACT

Soil-free living roof and wall systems comprising a living layer of Bryophytes, Lichen, And Vascular Epiphytes (BLAVE) on the surface of a thin, light-weight, flexible, fire-resistant mat of mineral wool having a density in the range of about 6-12 lbs/cu ft and thickness in the range of about ⅜" to about ¾". Mats are provided in modular units on the order of 2'×4'; no irrigation or growth medium is used. The mats are adhered to a roof or wall with adhesive or mastic, or may be secured with fasteners. In the preferred embodiment, modular units include flexible mineral wool mats over a base sheet of non-woven plastic fibers, on the order of from 2-4 mm thick, and a wide-mesh plastic netting over the BLAVE layer, sewn through to the base layer. Methods of mat module manufacture, innoculant mix production, installation and cultivation/propagation of BLAVE are disclosed.

9 Claims, 2 Drawing Sheets

(52) U.S. Cl.
CPC ............. *Y02P60/244* (2015.11); *Y10T 442/10* (2015.04); *Y10T 442/60* (2015.04)

(56) References Cited

U.S. PATENT DOCUMENTS

| | | | |
|---|---|---|---|
| 5,441,877 A * | 8/1995 | Chiaffredo et al. | 435/176 |
| 5,476,523 A | 12/1995 | Hiraoka | |
| 5,608,989 A | 3/1997 | Behrens | |
| 5,724,766 A | 3/1998 | Behrens | |
| 5,836,107 A | 11/1998 | Behrens | |
| 6,158,168 A | 12/2000 | Behrens | |
| 6,219,965 B1 | 4/2001 | Ishikawa et al. | |
| 6,250,010 B1 | 6/2001 | Behrens | |
| 6,601,340 B1 | 8/2003 | Behrens | |
| 6,739,089 B1 | 5/2004 | Behrens | |
| 7,104,006 B1 * | 9/2006 | Blaakmeer et al. | 47/59 S |
| 7,204,057 B2 | 4/2007 | Behrens | |
| 7,334,376 B1 | 2/2008 | Behrens | |
| 2008/0072488 A1 | 3/2008 | Fujita | |
| 2009/0176295 A1 | 7/2009 | Behrens | |
| 2009/0300981 A1 * | 12/2009 | Wilhelmus Cuypers et al. | 47/58.1 R |
| 2011/0179711 A1 * | 7/2011 | Cuypers et al. | 47/59 S |
| 2011/0262986 A1 * | 10/2011 | Burbaum | 435/167 |

FOREIGN PATENT DOCUMENTS

| | | | |
|---|---|---|---|
| EP | 485277 A1 * | 5/1992 | A01G 31/00 |
| JP | 2003009668 A | 1/2003 | |
| JP | 2003061458 A | 3/2003 | |
| JP | J1302003061458 A | 3/2003 | |
| JP | 2005151860 A | 6/2005 | |
| JP | 2006306645 A | 11/2006 | |
| JP | 2007195455 A | 8/2007 | |
| KR | 2006000324 A | 1/2006 | |
| WO | 0208540 A1 | 1/2002 | |
| WO | WO0208540 A1 | 1/2002 | |

\* cited by examiner

LIVING ROOF AND WALL SYSTEMS USING CULTIVATED MINERAL WOOL MATS TO SUPPORT BLAVES, METHODS OF CULTIVATION AND INNOCULANTS THEREFOR

CROSS-REFERENCE TO RELATED APPLICATIONS

This application is the Regular U.S. application of U.S. Provisional Application 61/305,413 filed Feb. 17, 2010 by the same inventor entitled Living Roof and Wall Systems Using Pre-Cultivated Mineral Wool Mats to support Bryophytes, Lichen and Vascular Epiphytes, the priority of which is claimed under 35 US Code 119 ff.

FIELD OF THE INVENTION

The invention is directed to a light-weight, soil-free, living roof and wall system comprising a living layer of Bryophytes, Lichen, And Vascular Epiphytes (BLAVEs) growing on the surface of a thin, flexible, fire-resistant support mat or sheet of mineral wool fibers having a density in the range of from about 6-12 lbs/cu ft and a thickness in the range of from about ⅜" to about ¾". The mats are provided in modular units having a size on the order of 2'-4'×4'-7' (typically 1 m×2 m). Optionally, the mats may include a fiber binder to permit ease of handling from manufacture through installation. Preferably the mats include a thin base or under-layment sheet of non-woven polymeric fibers on the order of from 2-4 mm in thickness, and a wide-mesh plastic netting over the living layer that is stitched through the mineral wool mat to the underlayment. No growth medium is used on or in the mat so the finished living mat is light weight, can be secured to a roof or wall surface with a glue or mastic, or may be secured with fasteners and is sufficiently flexible to follow irregular surface contours and angles. Innoculants and methods of propagation of the living layer are disclosed.

BACKGROUND

Current living roof systems seek to replicate a soil-based, in-ground system of plants with multi-layered structures or trays placed on a roof surface. The typical commercially available "Green Roof" systems are designed to replicate a soil-based ecosystem by providing a heavy, complicated series of layers to replicate the water flow and rooting material in natural, ground systems constructed on site or pre-manufactured as a modular tray system. The weight of such systems, on the order of 20-30 lbs or more per square foot, requires the roof beams and rafters to be specially engineered and beefed-up to carry the added weight of a saturated living roof system. Thus, for the most part, they are restricted to use in new, specially designed construction, not retrofit on existing roofs as the weight is so great that conventional, existing roofs could not safely carry the added load.

Such a multi-layer system typically consists, in order from bottom to top, of: a waterproof membrane laid over the roof structure top surface; a drainage layer; a root guard layer; a water retention layer; and a growth medium rooting layer on the order of from about 6" to about 18" deep, which supports a top layer of rooting vegetation. They may include additional layers or support structures of netting, trays or internal baffles to retain a growth medium on a sloped surface. Thus the typical currently available systems are either site constructed or pre-manufactured to provide a layer of soil on the roof which is then planted on site, or provided with a pre-cultivated vegetative layer. Current technology of both site-built and planted and tray-type pre-cultivated systems are complex, heavy, expensive, and cannot be installed on steep or vertical surfaces.

Examples of other mat systems are shown in the prior art, including Behrens U.S. Pat. No. 5,724,766 directed to use of a thick bat of rock wool as a growth medium for soil-based, rooting plants, such as grass. Plant roots penetrate the mat as they would soil. Providing nutrients to the root system is difficult in rock wool as it is porous and does not retain water well. Thick bats actually float in water, and can slide off roofs in wet conditions. Actual physical installations of this system have not been reported. Behrens also shows in U.S. Pat. No. 6,739,089, a multi-layer pre-seeded mat of flexible biodegradable material, in which the seeds of rooting plants are evenly distributed. This mat overlies and is stitched to a hygroscopic vegetation carrier layer described as "rock wool". In U.S. Pat. No. 6,158,168, Behrens discloses that German building codes require vegetative slabs to have resistance to fires, citing standard DIN4102, Part 7. In this Behrens variation, the portion of the vegetative slab that is mounted closest to the burnable surface, roof or wall, is fire-retardant water glass (a silica material). The slab comprises >20% by weight of organic substances, such as cocoa, hemp or flax fibers that are embedded in isocyanate foam binders, and includes embedded vascular plant seeds, sprouts and rhizomes.

Iwabuchi, in JP-2003-061458 (English Abstract) discloses a soil-less roof system comprising moss plus water-soluble paper on a base of palm bark that is watered to grow the moss, and then affixed to a building roof. It is not fire resistant. Hirayama, JP2005151860, English Abstract, discloses a net-like covering to prevent scattering of a layer of plants supported on a water resistant layer. The netting appears to be affixed to a water resistant layer by a jig or clip, and the combined laminate affixed to a roof.

Behrens U.S. Pat. No. 5,608,989 describes a 3-layer structure and the need for a drainage and venting (aeration) layer. His top layer contains 4 $Kg/m^3$ of activated carbon plus micro-organisms to adsorb hazardous elements from the atmosphere. This substrate layer can include "mineral wool, rock wool, and glass fibers". He also discloses a separation layer, a bottom drainage and venting mat, and a seal layer applied to the roof.

Other prior art examples of living roofs and walls include: Fujita US 2008/0072488 Published Application, (disclosing a multi-layer pre-seeded laminate comprising a water insoluble but tearable sheet that is pierceable by the plant growing tips); Berard (Interface, Inc of Atlanta, Ga.) WIPO Publication WO 02/08540, (disclosing a complex multi-layer structure comprising a root barrier layer of polyethylene sheet adhered to a roof, overlain, from bottom up with the following layers: non-woven poly-olefin drainage layer; ¼"-thick water retention layer 16 comprising a non-woven polyester with cross-linked super-absorbent polymer, called but not identified as SAP; a non-woven fabric impregnated with SAP; and finally a seed support layer of cellulose); Behrens U.S. Pat. No. 6,250,010, (disclosing a structural woven or non-woven material on a synthetic fiber substrate, wherein the non-woven top layer overlaps laterally so that there is a lap segment that rests on the adjacent section lower substrate); Behrens U.S. Pat. No. 7,334,376 (disclosing that wind flow over a roof causes up-ward suction that can peel the vegetative layer structure off the roof, so he provides holes in a lower, non-woven cotton layer, a non-woven polyester layer, and on which a looped polyamide fiber layer is glued with a layer of glue); Behrens U.S. Pat. No. 7,204,057 (disclosing use of electrically conductive filaments in a textile fiber substrate on which plans are grown, the filaments being said to shield building occupants against cell tower radiation); Ko, KR2006000324 (disclosing use of zeolite, perlite, illite, and vermiculite as inert fillers that function as heavy metal purifying agents in a composition for vegetative propagation that also includes cereal bran charcoal, "coir dust", which is cocoanut husk dust, organic fertilizers and a cracking-prevention agent); Ebara, JP2007195455 (disclosing porous substrate for growing grass comprising recycled waste fiber-reinforced cement board); Miwa, JP2003009668 (disclosing open cell foamed glass as a substrate for growing rooting plants on vertical surfaces); Takahashi, JP2006306645 (disclosing a method of producing a base material for surfacing a wall face or roof for supporting plant growth comprising a slurry of both meltable and un-meltable material, fibers and bubbles are added, the material apparently cast in a form, dried and fired at from 400-1300° C.); Ishikawa, U.S. Pat. No. 6,219,965 (disclosing a 3-layer sheet structure for growing grass turf comprising a base web of woven or knitted cotton, polyester or acrylic material for holding water, a core layer, comprising a 3-D open mesh of synthetic resin fibers loaded with sawdust, etc. disposed on the base and including stitched pile yarns projecting above the core layer as plant protection, and grass seeds are sown into and onto the core layer, the grass roots penetrating that layer); Meyer, DE 19629669 (disclosing a 7-layer structure, including a barrier layer, a support sheet, a substrate, and a layer of plant material layer that roots in a plant fiber layer. Over the plants are placed a coarse mesh jute fabric net, and then on top is a spun bonded web. In an alternate embodiment, a metal mesh (screen) is placed between the support and substrate. The whole multi-layer assembly is stitched together).

Accordingly, there remains an unmet need in the art for a living roof and wall system that is inexpensive, easily installed, easy to propagate, easy to maintain, is light weight and less complex, can be used on steep slopes and vertical surfaces, does not require soil or soil substitutes, does not require extensive watering and drainage systems, may be retrofit on suitable existing roofs since light enough to be borne by the load capacity of in-place conventional roofs, is fire resistant, provides an added layer of roof insulation, and is environmentally "green".

THE INVENTION

Summary of the Invention

The invention is directed to a soil-free, living roof and wall system, that is either pre-innoculated and pre-cultivated or post-installation innoculated, having a light weight, flexible support mat system. The inventive living roof and wall system comprises a living layer of Bryophytes, Lichen, And Vascular Epiphytes (herein "BLAVEs"), which in a first embodiment are grown on the surface of a thin, flexible, fire-resistant support mat of mineral wool fibers having a density in the range of from about 6-12 lbs/cu ft and a thickness in the range of from about 3/8" to about 3/4", a 1/2" being an exemplary preferred embodiment.

To assist in handling during manufacture and installation the mineral wool fibers of the mineral wool mats are adhered together to help retain the dimensional integrity of the mats by use of a liquid binder that is coated on, impregnated into, or mixed with the mineral wool during formation of the mineral wool sheet, and then dried or cured. The amount of binder can be adjusted to provide a greater or lesser degree of flexibility, and degradable binders are preferred so that over time the mats relax and conform better to the surfaces on which they are mounted, e.g. irregular roofs or walls. In a typical implementation the mineral wool mats are cut from larger sheets into modular units having a size on the order of 2'-4'×4'-8' (typically 1 meter by 2 meters). No growth medium is used on, or in, the mat. The mat is adhered to a roof or wall surface with a glue or mastic, or may be secured with fasteners.

In the presently preferred embodiment, the modular mat units are a multi-layer assembly comprising: 1) an intermediate layer of the thin, flexible mineral wool mat on the top surface of which 2) is placed the BLAVE layer described above. These two layers are together disposed on 3) a base layer of non-woven plastic fibers, in the form of a felt-type sheet material on the order of from 2-4 mm in thickness. Then, 4) a top layer of wide-mesh plastic netting is used to hold the BLAVE layer in place. The netting is secured to the base layer by stitching passing through the BLAVE layer plus the flexible mineral wool mat intermediate layer. The living BLAVE layer is retained on the mineral wool mat by the netting.

The resulting assembly, even when wet, has excellent structural integrity, even though flexible, that can withstand construction handling and installation on flat and steep pitched roofs and on vertical walls. The wet mat modules can be picked up by hand at a corner and transported or positioned without tearing. Experience with an actual installed living roof in accord with the invention has demonstrated that it can resist high wind forces.

By mineral wool is meant rock wall, stone wool, slag wool, man-made mineral fiber and man-made vitreous fiber, such as fiberglass, and synthetic, inorganic vitreous fiber. Any suitable binder material may be used, and preferred binders include curable organic or thermo-settable resins, such as phenolic resins, polyolefin resins, acrylic, vinyl and the like, and inorganic silica-based cementitious materials such as water-glass, also known as silica gel. The amount of resin may be selected to provide any desired amount of rigidity, it being understood that the resulting mats are preferred to retain some flex, but may be, as initially manufactured, easily flat-stack-able slabs and may be described as semi-rigid. Typically, the amount of binder that may be used ranges from about 1% to about 10% by weight, and more preferably a range of from about 2% to 6% by weight.

The inventive completed, pre-cultivated, four layer (mesh, BLAVE, mineral wool and under-layer) damp (wetted but drained) flexible mats have a weight on the order of up to about 5 lbs/square foot. The mats can be pre-cultivated and dried for storage and shipping, in which case the weight is on the order of 1-2 lbs/square foot. While the inventive mat system is preferably employed in new construction having roof structural members engineered to sustain a given design load including a mono-layer roof sealing membrane plus the inventive pre- or post-cultivated wet mats, the inventive living roof system mat assemblies can be retrofit in existing construction where it is verified that the roof structure is capable of carrying the extra load.

In the inventive flexible, modular BLAVE mat system and method, the thin layer of mineral wool serves as a fire resistant mat to support a plant layer consisting essentially of Bryophytes and Lichens (having no root systems) and Vascular Epiphytes whose roots develop but are maintained (reside) on the surface of the flexible mineral wool support mat. Examples of the BLAVE vegetative layer include species of: Bryophytes, which are mosses and liverworts; Ephiphytes, which are plants that grow upon another plant without taking nourishment from its support host, such as some species of ferns, orchids, bromeliads, philodendrons, rhododendrons, and cacti (some Bryophytes are Epiphytes); Lichens which are a class of living organisms composed of fungi and algae in a symbiotic union. Mosses, for example, support ferns, lichen and selaginella, so there is an entire complex ecosystem in the BLAVE vegetative layer.

Water and nutrients for the BLAVE plant layer come from the air and not from a growth medium. Accordingly they need not be fertilized or fed, although they can be watered and nutrients applied if desired. Since the mineral wool does not serve as a growth medium, and indeed there is none, the mats are thin, ranging from about ⅜" to about "¾" in thickness. Being multi-layer (mineral wool mat and base layer stitched together with the netting over-layer) and preferably containing a small percentage by weight of fiber binder, they retain dimensional stability during the initial vegetative propagation of the BLAVE and during storage, transport and installation handling. Being thin and containing no soil or equivalent rooting layer, the mats are very light weight.

The mineral wool mats are attached directly to the roof or wall surface, preferably by use of a roofing adhesive, where they provide insulation to the supporting surface. The insulation value cools the underlying supporting structure in the Summer and assists in reducing heat loss in the Winter. In addition, the inventive mats shield the roof surface from UV degradation, extending the roofing material life on the order of 2×-3×. The mineral wool is fire resistant, and thus provides additional fire retardant layer to the structure. In the case of an external fire, the BLAVE layer, when dry, may burn as a quick, low-energy, low-flame fire, typically smoldering and charring. But the BLAVE layer does not propagate walls of flame, as in some cases of roof-grown grasses and other large rooted vegetation. It should be understood that where desired for additional fire resistance, for example in arid or canyon areas subject to wind driven forest, brush or grass fires, the mat thickness may be increased, as determined by those skilled in the art weighing the factors of fire resistive properties vs weight of the mineral wool flexible mats, per unit thickness.

It should also be noted that the inventive living roof modular mineral wool mats are not highly hygroscopic and do not hold nutrients well. The amount of binder is easily selected by one skilled in the art to be sufficient to render the fibers of the mineral wool mat cohesive forming easily handled modular units, but not so much as to render the mats impervious to water. The binder degrades over time, typically after installation, and biodegradable binders are preferred. Dimensional stability of the mineral wool layer is maintained by the base, under-layer and stitching to the mesh over-layer.

The resulting mats are water permeable, but the mineral wool is not hydrophyllic. Thus, the mats do not become heavy and waterlogged. The BLAVE layer does retain sufficient moisture for the slow growth of the layer. Indeed, the nature of the selected species and varieties of temperate zone BLAVEs are such that they do not thrive in overly saturated conditions, and prefer to go into dormancy during the Summer During the dormant period they turn a pleasing brown color, but revive upon the first Autumn rains. A corollary is that they need not, and indeed, should not be continuously watered. The result is a living roof and wall system that has aesthetically pleasing seasonal color change, and that once established, it need not be irrigated. The inventive living roof and wall system thus does not need or include a complex, heavy irrigation system or drainage layer.

The species of BLAVE plants can be selected for coloration, and different areas of the living walls using the inventive system, may, for example, be propagated in a variety of different BLAVE plants to provide artistic or utilitarian designs differentiated by different colors at different times of the year. The result is the ability of the building or landscape architect to use a wide range of BLAVE species as a living color palette, bringing added dimension to building design and site integration. Temperate zone BLAVEs are disclosed herein by way of example, but it should be understood that the principles of the invention apply to tropical and sub-tropical BLAVE, as well as arid zone BLAVE species.

The invention includes methods of propagation of the vegetative BLAVE plants on the mats prior to (pre-cultivation), or after installation (post-cultivation), as well as the method of installation onto a roof or wall surface by adhering or use of mechanical fasteners. Thus the invention includes a pre-cultivated BLAVE layer or coating applied over the mineral wool and polymeric under-layer mat assembly, or the three-layer mats (netting, mineral wool layer, and base layer) may be provided bare, with a BLAVE inoculation mixture applied thereon after installation. The invention includes methods of maintaining the installed BLAVE layer as a soil-free living roof or wall ecosystem.

The selection of BLAVE species for the living layer of the mat modules is based on the local climate and site conditions. Some species of Epiphytes prefer full sun, such as red roof moss, and Lichens. Some require partial shade or thrive in full shade. The rootless Bryophytes and Lichen attach themselves tenaciously to the mat surface much as they do to a rock or tree bark, thereby resisting substantial wind and gravity forces. Vascular Epiphytes grow roots into an established Bryophyte layer or cling to the mat surface. There is no growth medium to erode or leach away.

In a first embodiment, pre-cultivated modular mat assemblies (combined base layer/mineral wool/BLAVE/netting) are lain on and attached to a water-impervious roof surface, e.g., by adhesive applied to either the roof membrane or the underside of the rigid mat slabs. A suitable example is a solvent-based contact adhesive having a synthetic rubber base of the type used to bond roof membrane sheeting to porous and non-porous roofing substrate sheeting. The flexible mat modules are laid much as tile. The roof surface may be an already existing membrane, steel, tile, slate, shingle, asphalt shingle or composition roof. Or the roof may be new construction, with bare OSB, plywood or steel deck roof sheet which is then overlain with an impervious 80-90 mil thick synthetic rubber or plastic membrane, such as a reinforced EPDM (ethylene propylene diene M-class rubber) or/an TPO (thermoplastic polyolefin polymer). The membrane is fully adhered with a contact adhesive (as described above) or secured with mechanical fasteners whose heads are sealed with a suitable sealant compound. The pre-cultivated mat modules are adhered or mechanically secured to the membrane surface as described above. In the case of the bare mats, once secured in place they are "innoculated" with BLAVE innoculant solution and sprayed with water or nutrient solution, as needed.

The process of preparing an innoculant composition followed by applying to the mineral wool layer comprises suspending clumps (preferably comminuted) of freshly harvested moss or BLAVEs in a carrier medium to form a vegetative innoculant slurry, and spraying, calendaring or roller coating the innoculant slurry onto the top surface of the mats. The carrier medium may be fresh water, or a nutrient solution, and may include biodegradable surface binders that assist in retaining the slurry onto the surface of the mats, particularly where the roof surface is slanted, or the innoculation is done on a vertical wall surface. Preferred binders and viscosity modifiers include organic materials that are highly water absorbent so the fragments of BLAVE species are held in place while they propagate. Suitable binders and viscosity modifiers include but are not limited to: guar gum, quebracho, fillers such as cellulose and methyl or carboxymethyl cellulose derivatives, tannins, hydrolyzed PVA, and the like. Nutrient solutions include water plus nutrients, buttermilk, soy protein in water, varous oils in carriers such as canola, olive, soybean, cottonseed, corn, palm, coconut, and bacthun oil, fertilizer solutions and the like.

Temperate BLAVE species are generally acotyledons, propagating from plant cell and tissue fragments or spores, as distinct from true seeds. Some tropical vascular epiphytes, such as orchids, do have tiny underdeveloped embryos, depending on mycorrhizal fungi for their early nutrition, thus being myco-heterotrophs at the propagation initiation stage. Thus, the most appropriate term used for propagation initiation in the inventive process is innoculating as distinct from seeding.

The BLAVE innoculant grows on the mineral wool layer and is intertwined with and retained by the mesh netting. This growth may take from several weeks to months or seasons to form a fully pre-cultivated mat assembly. In the case of the pre-cultivated mats, the layer of BLAVE vegetation can be let dry, and shipped in the dry state to the building site for installation. The dry, pre-cultivated mats are thus lighter in weight than the fully hydrated mats. After installation, the BLAVE layer is rehydrated and the plants revive and flourish.

Any method of securing the mat to the roof may be used, including clips, one end of which slips under the exposed end of shingles. In a preferred mat system of the invention on which the BLAVE layer is installed or propagated, three layers are used: first a lower, base layer of non-biodegradable, non-woven thermoplastic fabric, such as 10-20 oz/square yard non-woven polypropylene fabric that optionally may include stabilizers to resist mildew and insects is provided. The thin mineral wool mat is placed on the base fabric layer. The third, top layer is a U.V. stabilized polyethylene netting having apertures in the range of from about ½" to 4" depending on the wind load. The upper and lower layers are stitched together through the intermediate rigid mineral wool layer to hold the layers together and maintain dimensional stability. The lower, fabric layer is secured to the roof or wall surface, e.g. with the contact adhesive. In the case of the pre-cultivated mats, the BLAVE layer is applied over the mineral wool layer, the netting overlain, and stitched to make the 4-layer living assembly. The netting assists in retaining the BLAVE layer to resist wind uplift forces. The moss, ferns, selaginella, or the like, grow up through and hide the netting.

In the case of bare, un-cultivated but innoculated mats, the top surface of the 3-layer laminate is then coated through the netting with the moss slurry, dried, stacked and bundled, stored and shipped to the building site. Being dry, they are light weight, dimensionally stable and are easy to package, ship and handle. At the building site, the "pre-innoculated" dried mat slabs are installed onto the roof, wetted and the BLAVE plants begin to grow. The freshly installed roof may be selectively sprayed with water just enough to promote fast establishment of the BLAVE living roof or wall layer. The system is light-weight, fire-proof, porous and provides insulation in summer and winter.

In still another embodiment, bare un-cultivated and non-innoculated mat assembly modules are shipped and installed, after which the entire roof surface is sprayed or coated in place with the innoculant solution, and watered sufficiently to promote the propagation of the BLAVE living layer. This innoculant spray or coating process also permits repair of dead areas that might occur, or replacement of individual modules that are damaged followed by "re-innoculation" by spraying or coating with the innoculant solution.

In another pre-cultivation process, moss and other BLAVE species are harvested in clumps or sheets of varying size from natural sources, including the ground, roofs, downed trees and the like, and these pieces are adhered to the top surface of the rigid mineral wool mats with plant fixatives. Thereafter the netting is placed over the assembled moss layer, and secured to the mat or to the fabric underlayer via stitching.

It should be noted that the integrity of the inventive cultivated BLAVE mineral wool mat assembly is strong enough that a module on the order of 2'×4' can be suspended by the 2' edge as a hanging banner.

BRIEF DESCRIPTION OF THE DRAWINGS

The invention is described in detail with reference to the drawings, in which.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention. In the following, the description of the invention has been provided as usage in living roof system or a living wall system. However, it is to be understood that the invention may also be applied in other fields, and to other usages.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
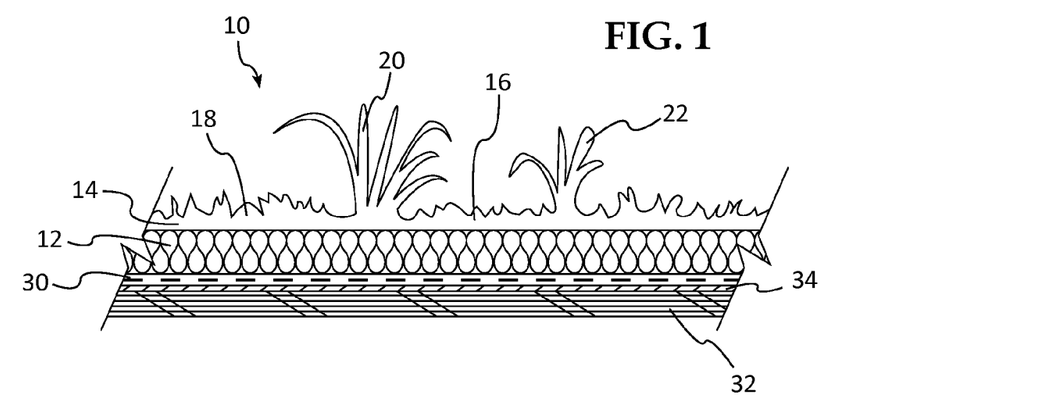
FIG. 1 is a vertical section view through a first embodiment of the inventive mineral fiber mat system in the cultivated state.

As shown in FIG. 1, the inventive pre-cultivated flexible, light weight, modular living roof and wall mat 10, comprises a thin, flexible ⅜"-¾" thick mat of mineral wool 12 on which is supported a living layer of BLAVE plants 14. The BLAVE layer ranges from a thin layer of lichen 16, to a ½-4" thick layer of moss 18, or even taller vascular epiphytes, such as ferns 20 and selaginella 22. The selaginella is particularly desirable near roof overhangs, as it will drape below the outside edge of the mat 12. The bottom surface of mat 1 is adhered with adhesive or mastic 30 to a roof or wall surface 32 that is preferably covered with a polymeric water proof membrane 34. The result is a living roof or living wall. In FIG. 1 the surface 32 is shown as wood.

Figure 2:
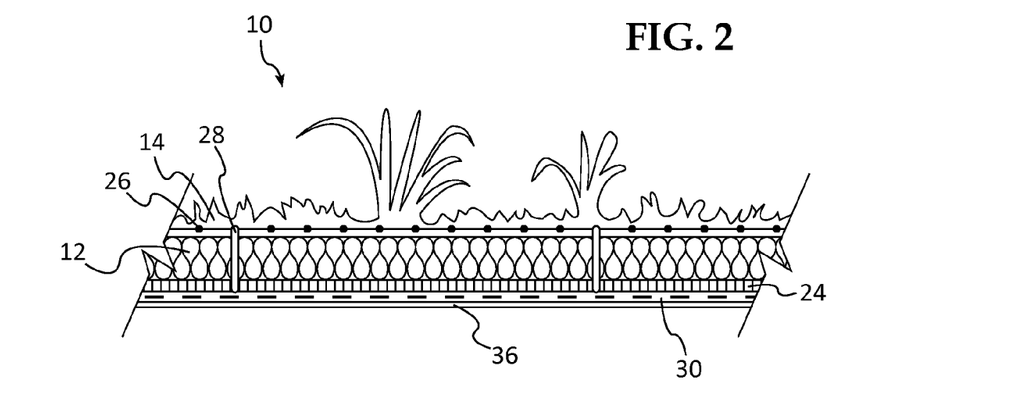
FIG. 2 is a vertical section view through the preferred second embodiment of the inventive mineral fiber mat system showing a top mesh and bottom non-woven layers provided to make the individual mat modules more robust in handling, installation and service, in the cultivated state.

In the preferred embodiment shown in FIG. 2, to increase the integrity of the mat during construction, storage, transport and installation, and to permit vertical installation on walls, banners, canopies, and the like, and to resist wind uplift forces, a lower layer 24 of non-biodegradable, non-woven, thermoplastic, water permeable fabric of approximately 100 mils thickness and an upper layer 26 of U.V. stabilized polyethylene net with a mesh size of approximately ½ inch are used. The lower fabric layer 24 is adhered with adhesive 30 to the membrane sheet 34 on a roof or wall surface 32, as shown in FIG. 1. However, as shown in FIG. 2, the fabric layer 24 may be adhered directly to metal roofing 36, which typically does not require a membrane covering. The netting 26 helps to retain the living surface material against dislocation and blow-off during wind events.

Further, the netting 26 and base fabric layer 24 are preferably secured together by stitches 28 passing through the intermediate mineral wool rigid mat layer 12 and BLAVE layer 14 to hold the inventive living mat system laminate together. If the intermediate mineral wool mat 12 becomes damaged, the stitches 28 can be selectively removed or cut to allow the mat 12 and upper netting 26 to be released from the adhered bottom fabric layer 24. A new, pre-cultivated mineral wool mat assembly as in FIG. 1 is glued or fastened to the original fabric layer. Or in the alternative, a bare mineral wool mat and mesh may be secured onto the base layer 24, and a new vegetative layer 14 is introduced onto the cleaned mat by spraying or coating with innoculant mix. This restores the damaged assembly once a viable surface of living matter has become established. Depending on the extent of damage or deterioration of the mineral wool layer, a new base layer 24 can be stitched on to the recycled original mineral wool mat (FIG. 1) and that recycled mat system, now as in FIG. 2, is adhered to a new roof surface.

The mats can be pre-cultivated with a growth of BLAVE vegetation 14. The pre-cultivated mats can be delivered to the site and installed with a growth of living matter already established. Bryophytes and lichen have the ability to re-grow from tiny fragments. The mat surface can be pre-cultivated by treating the surface with a pH enhancing nutrient compound or composition such as buttermilk and then scattering bryophyte and/or lichen fragments on the surface. Over time Bryophytes and/or Lichen will cover the entire surface. Vascular Epiphytes can then be planted into the Bryophyte layer. The BLAVE vegetation derives its nutrients from rainwater and atmospheric dust. No growth medium is required.

The BLAVE vegetation layer has the ability to lose almost all moisture and go into a period of dormancy. In the presence of water, it will promptly revive. For ease of delivery, the pre-cultivated mats can be dehydrated, shipped at a lighter weight, and then rehydrated once installed on a building surface.

Figure 3:
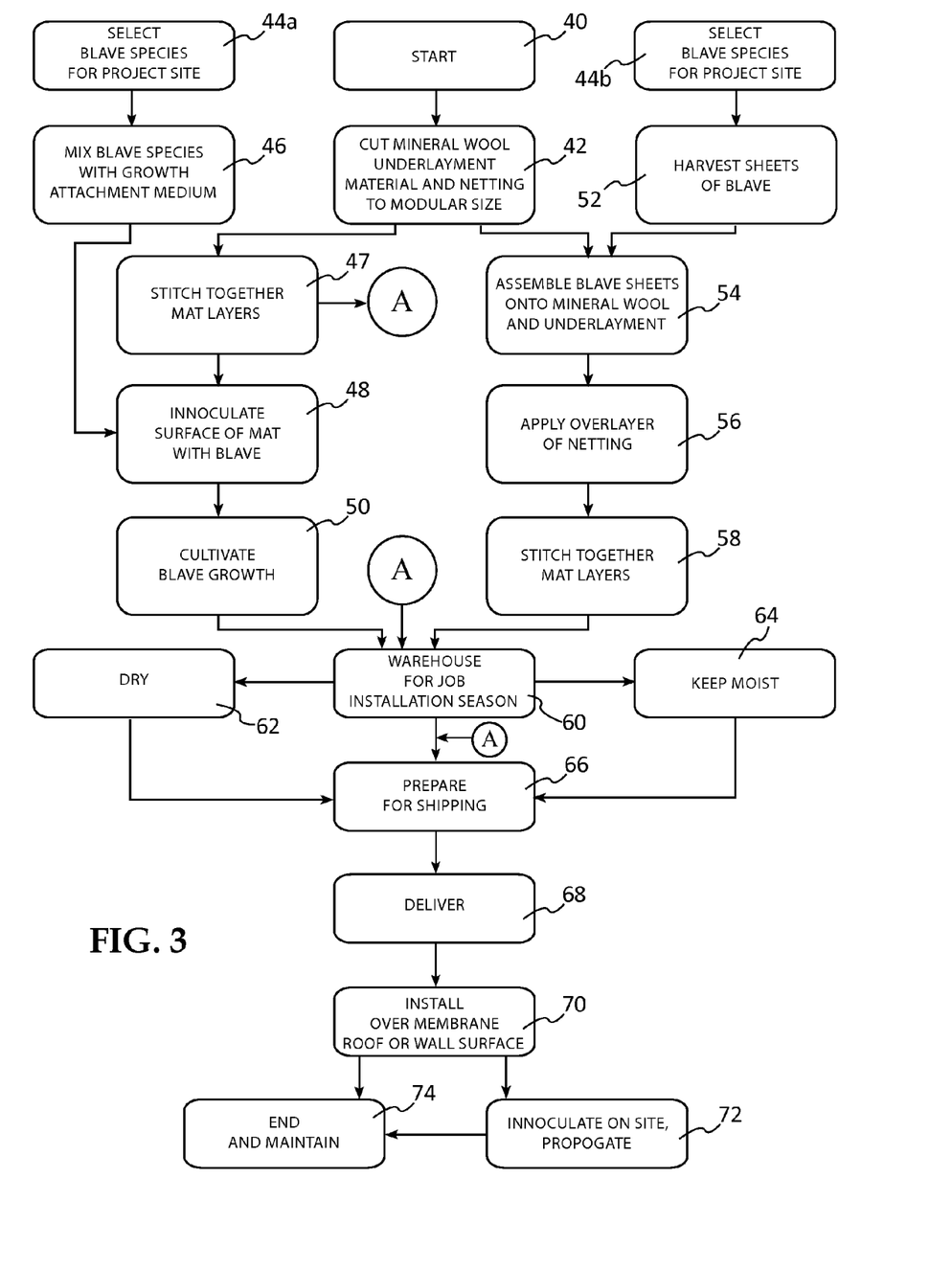
FIG. 3 is a flow sheet of the manufacture of modules plus propagation of BLAVE layers thereon, either as pre-cultivated modules prior to installation, or post-installation propagation, repair or re-inoculation.

FIG. 3 is a flow sheet of the process aspects of the invention. From Start 40, in a first step 42 the several layers of material, thin mineral wool, underlayment base layer sheet and netting are cut to modular size. In a first alternative process branch (left side of FIG. 3), the multiple layers of the mat module assembly are stitched together at 47. Previously or simultaneously, BLAVE species are selected at 44a for a given project site and environmental zone, e.g., a temperate zone. The BLAVE vegetation may be fragmented by hand or comminuted and mixed with growth/attachment medium at 46. The stitched-together mat of 47 is then sprayed or coated with the BLAVE innoculant of 46 onto the surface of the completed mat at 48, and the BLAVE layer is cultivated at 50. In another branch of the process, the completed, but uncultivated mat assemblies at 47, that is mat modules without a BLAVE layer, are set aside at "A" for later handling as described below.

In an alternative process branch (right side of FIG. 3), as before, the BLAVE species are selected for the project at 44b. The selected species are harvested from farms or natural sources at 52 in entire sheets or smaller pieces and collected, sorted and stored as construction material, upon which they are assembled at 54 onto the combined underlayer and mineral wool module layers from 42. The netting is applied over the BLAVE assembled on the mats at 56 and then the 4-layer "laminate" of net, BLAVE, mineral wool and base layer is stitched together at 58.

Any one or more of the three optional assemblies, 50, 58 or sub-assembly 47, is warehoused at 60 for the job installation. Note that the designator "A" at 47 and again at 60 indicates the sub-assembly 47 may be warehoused without BLAVE assembly or propagation (inoculation and cultivation) for direct installation on a roof or wall followed by BLAVE propagation post-install on-site, described below.

The warehoused assemblies having propagated or harvested BLAVE are either dried at 62 to reduce shipping weight, or kept moist at 64, as the job/site requires. The warehoused BLAVE mat assemblies are then prepared for shipping at 66, typically a stack of 20 or more on a pallet or in a shipping box. The pallet stack may be banded or clear plastic wrap wound around to keep them on the pallet. The pallets are delivered 68 to the site, and the BLAVE module mats are installed 70 over existing roofing (e.g., asphalt shingles or a thick monolayer roof plastic membrane or sheet) or wall by adhesive application or other fasteners as suitable for the job application.

Where the sub-assembly module of 47 is installed without BLAVE, there is a post-installation application 72 of the inoculate 48 on the job site, followed by propagation. That ends the manufacture and installation process 74. Post installation, the BLAVE is maintained as needed. Typically the BLAVE species are very long lived, and continuously regenerate so that maintenance is a minimum, being mainly monitoring and replacing deteriorated sections, if any. As noted, the BLAVE does not need watering or irrigation or fertilizing, and goes through a natural annual cycle of color change.

Where the BLAVE is selected to be initially predominantly mosses and lichen, after mature establishment of the ecosystem, larger vascular epiphytes such as orchids, ferns, sellaginella and the like can be introduced by inoculation with a suitable mix of vascular epiphyte species in the carrier fluid, or inserted into the moss BLAVE layer. The result is a more three-dimensional roof or wall layer having vertical height (roof) or horizontal projection (wall).

It should be noted that as the BLAVE layer grows, the netting is completely shielded from the sun, so there is little exposure of the netting plastic to photo-degradation, which contributes to a long service life of the assembly, projected at 10-20 years or more.

EXAMPLE 1

Following the process steps on the right side of FIG. 3, 575, 2'×4' modular BLAVE mats of the invention were prepared and installed on the second floor roof of a newly constructed college building, Maier Hall of Peninsula College in Port Angeles, Wash. The BLAVE selected was indigenous temperate zone BLAVE species. The flexible mats were stacked 20 or more high for shipping and handling by conventional fork-lift. No special heavy lifting equipment was required to get the mats up to the roof as they are very light, on the order of 25-35 lbs per module. The modular mats are easily installed by hand by minimally trained construction workers. A squiggle of construction adhesive was extruded from standard caulk guns onto the mono-layer roof membrane and the modules lain down thereon and tamped down gently by hand. The flexibility of the mats permitted them to ride up and cover exposed walkway bosses that were present on the roof. The total installation area is on the order of 4600 square feet, and the normal rain in the area is sustaining the resulting living roof.

INDUSTRIAL APPLICABILITY

It is clear that the inventive living roof and wall system of this application has wide applicability to the construction industry, namely to improved energy-efficient and ecologically green wall and roof coverings. The system clearly is simple to install and maintain, and thus has the clear potential of becoming adopted as the new standard for living roofs and walls.

While the invention is susceptible of various modifications and alternative construction, various illustrated embodiments have been shown in the drawings and described in detail. It should be understood that there is no intention to limit the invention to the specific forms disclosed, but on the contrary, the invention is intended to cover alternatives, modifications and equivalents, which are included within the spirit and the scope of the invention. Accordingly, it is clear that various modifications within the scope of this invention can be made by one of ordinary skill in the art without departing from the spirit thereof and without undue experimentation. For example, the mats can have a wide range of rigidity and thickness to provide the functionalities disclosed herein. Likewise the mat material may be fiberglass rather than mineral wool. This invention is therefore to be defined by the scope of the appended claims as broadly as the prior art will permit, and in view of the specification if need be, including a full range of current and future equivalents thereof.

The invention claimed is:

1. A living roof or wall system mat assembly, said assembly consisting of:

a) a soil-free, light weight modular dimensional mat unit of thin, flexible mineral wool having a density of from about 3 Kg/c.f. to about 5 Kg/c.f., a thickness in the range of from about 0.9 cm to about 2 cm, and a top and a bottom surface, said mat being water permeable but not hydrophilic and not serving as a growth medium;

b) a living layer of bryophytes, lichen, and vascular epiphytes (BLAVEs) forming a complex ecosystem supported on and growing on said top surface of said modular dimensional mineral wool mat unit without being continuously watered;

c) a base layer of porous, non-hygroscopic, non-biodegradable, non-woven thermoplastic fabric having a top surface and a bottom surface, and a thickness in a range of from 2-4 mm, said base layer is disposed with its top surface in contact with said bottom surface of said modular dimensional mineral wool mat unit;

d) ultraviolet-stabilized plastic netting having a mesh size in a range of from about 1-10 cm disposed over said modular dimensional mineral wool mat unit having said BLAVEs layer supported on the surface thereof, said netting is secured to said base layer and said BLAVEs layer is retained by said netting; and e) thereby forming a unitary mat assembly that is light weight, easy to store, ship and handle and as mounted on roofs or walls forms a living roof or wall surface of a structure exposed to an outdoor environment, which unitary mat assembly does not require irrigation or drainage systems, the mineral wool mat providing an insulating and fire resistant layer for said structure.

2. The living roof or wall system mat assembly as in claim 1 wherein said BLAVEs are selected from a layer of BLAVEs inoculant mixture, a layer of propagated living BLAVEs, or a harvested indigenous or cultivated BLAVEs layer disposed on a top surface of said mineral wool mat.

3. The living roof or wall system mat assembly as in claim 2 wherein said BLAVEs layer has been dried to reduce shipping weight.

4. The living roof or wall system mat assembly as in claim 2 wherein said inoculant mixture comprises finely divided fragments of BLAVEs species in a carrier fluid.

5. The living roof or wall system mat assembly as in claim 4 wherein said inoculant mixture includes an adjuvant selected from nutrients suitable for propagation of said BLAVEs species, an adhesive to promote retention of said mixture on a mineral wool surface, and combinations thereof.

6. The living roof or wall system mat assembly as in claim 1, wherein said BLAVEs layer is a living sheet formed from at least one of harvested indigenous BLAVEs from a natural ecosystem, cultivated BLAVEs in a dedicated farm, forest or greenhouse environment, or propagated selected BLAVEs species inoculated on said top surface of said mineral wool mat with an inoculant mix of finely divided said BLAVEs species and a carrier fluid.

7. The living roof or wall system mat assembly as in claim 6, wherein said living BLAVEs layer of said modular unit is dry to reduce the weight of said mat assembly for shipping and installation.

8. The living roof or wall system mat assembly as in claim 7, wherein said modular unit is installed in a dry condition on a roof or wall surface with said bottom surface of said base layer secured to said roof or wall surface, and said BLAVEs layer is rehydrated after installation.

9. The living roof or wall system mat assembly as in claim 6, wherein said modular unit is installed on a roof or wall with said bottom surface of said base layer secured to said roof or wall surface.

* * * * *